Oct. 7, 1941.    G. B. WARREN    2,258,230
VALVE
Filed Sept. 14, 1939

Inventor:
Glenn B. Warren,
by Harry E. Dunham
His Attorney.

Patented Oct. 7, 1941

2,258,230

UNITED STATES PATENT OFFICE 2,258,230

VALVE

Glenn B. Warren, Schenectady, N. Y., assignor to General Electric Company, a corporation of New York Application September 14, 1939, Serial No. 294,891

2 Claims. (Cl. 251—29)

This invention relates to valves and more particularly to valves of the type comprising a housing having a stationary seat and a cooperating disk member carried by a stem longitudinally movable in the housing.

The interior parts of valves of this type, when used in steam systems and the like, frequently become coated with deposits of lime or similar material carried by the steam. Such coatings, if sufficiently thick, may seriously interfere with the proper operation of the valves. For example, in the case of a steam turbine control valve, a portion of the valve disk operating stem is normally in the direct path of the steam admitted to the turbine. Due to the extremely small clearance provided in the bushing for the valve stem, even a very thin coating or deposit may cause sticking of the valve. Since such valves are usually governor operated, for smooth regulation of the turbine the valves must be freely movable. Otherwise they will respond inaccurately or jerkily to the impulses of the actuating mechanism. If the deposits on the stem are sufficiently thick, the valve may even become jammed in one position, sometimes causing the machine to run away upon loss of load, or necessitating a costly shutdown of the unit and a reconditioning of the valve.

It is an object of this invention to provide a new and improved valve structure in which the operating stem is substantially protected as against deposits of material carried by the fluid passed therethrough.

It is a further object of this invention to provide a new and improved valve structure of the type referred to, which is low in manufacturing cost and reliable in operation.

In accordance with the illustrated embodiment of my invention, I provide a valve with a disk having a substantially cylindrical body extending upwardly therefrom to a height substantially equal to the valve lift. A tubular sleeve is secured to the valve head and depends in a concentric arrangement around the valve stem and the cylindrical body of the disk. The lower end of the sleeve extends inwardly toward the cylindrical body and substantially engages the body with a knifelike edge. The valve stem, longitudinally movable within the sleeve is substantially enclosed thereby and is protected from deposits of material carried by the fluid flow.

Figure 1:
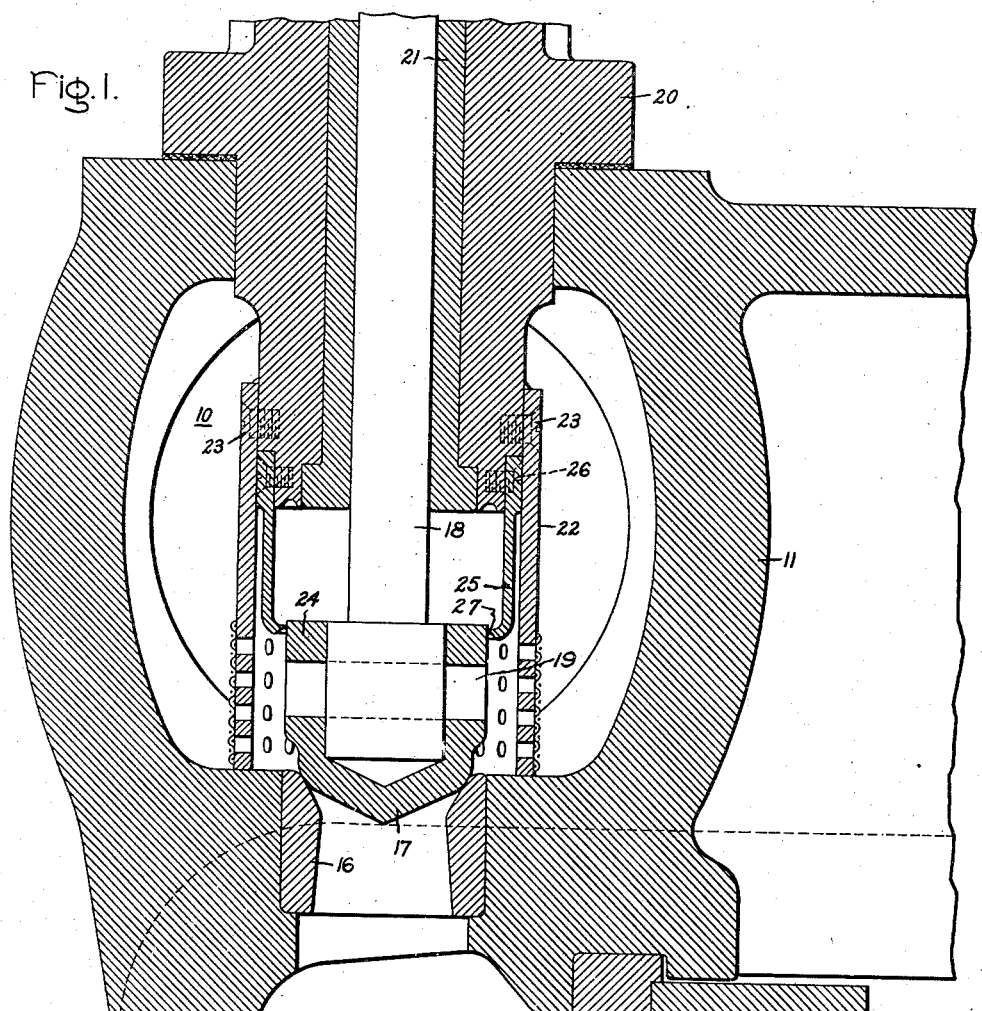
Figure 2:
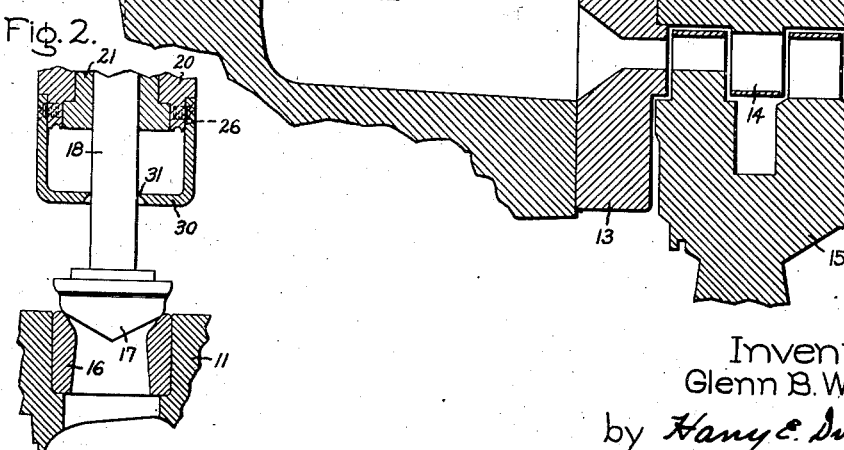

For a consideration of what I believe to be novel and my invention, attention is directed to the following description and the claims appended thereto taken in connection with the accompanying drawing in which Fig. 1 is a cross-sectional view of a valve structure illustrating one form of the invention and Fig. 2 is a fragmentary detail view illustrating a modification thereof.

Referring to the drawing, the valve is illustrated as being embodied in a steam turbine having a steam inlet 10, a valve casing or chest 11, a nozzle chamber 12, a nozzle ring 13 and one or more cooperating nozzle diaphragms and rotor units 14 and 15, respectively. The flow of steam from the inlet to the turbine is controlled by a valve comprising an orifice seat 16 secured in the lower portion of the casing 11 and a cooperating disk 17 which is secured to the lower end of the longitudinally movable stem 18 by means of the pin 19. The stem 18 is slidably mounted in the head 20 and within the sleeve bushing 21. A suitable cylindrical strainer 22 is secured by screws 23 to the lower portion of the head 20 which depends into the valve chamber and surrounds the valve opening so as to substantially preclude the passage of foreign objects into the interior of the turbine.

In accordance with my invention, I provide the upper surface of the disk 17 with an upwardly extending cylindrical body 24 concentric with the stem 18, the outer side wall of which is of a height at least equal to the total valve lift. A tubular element 25 is arranged within the strainer 22 concentric with the stem 18 and the cylindrical body 24 of the disk and is secured at its upper end by screws 26 to the valve head 20. The lower end of the tubular member 25 is provided with an inwardly turned portion having a thin knifelike edge 27 substantially engaging or in close proximity with the circumference of the side wall of the disk body portion 24. During the assembly of the valve the disk may be moved a few strokes to wear the thin edge of the tubular member somewhat so that the disk will thereafter experience little or no resistance to movement by virtue of the slight frictional engagement therewith.

The tubular member 25 substantially encloses the portion of the valve stem extending below the lower extremity of the sleeve bushing 21 and protects this stem portion from the direct flow of steam. Due to the relative thinness of the edge 27, any coating deposited upon the side walls of the disk body will be scraped therefrom or if such a coating becomes extremely hard, then the knife edge 27 will be readily worn away while a minimum clearance will always be maintained between the thin edge 26 and the adjacent disk part. The space within the tubular cylinder 25 between the upper surface of the disk body and the lower end of the head 20 will be filled with relatively dead steam at the same pressure existing within the valve casing proper. No circulation of steam will take place through this space and consequently the valve stem will be substantially protected from any deposit which might otherwise be formed thereon if it were directly exposed to the flow of operating fluid.

It is obvious that the valve disk need not necessarily be provided with the cylindrical body portion for cooperating with the tubular shield member 25. Instead, the lower end of the tubular member may be adapted to engage directly with the stem as indicated in Fig. 2. There, the lower end of the tubular member 30 extends inwardly toward the stem and is provided with a thin knifelike edge 31 which is in substantial engagement or in close proximity with the circumference of the stem. The tubular member extends downwardly from the valve head a distance at least equal to the total valve lift and protects the enclosed stem portion from the depositing of material carried by the fluid flow.

Having described the principle of operation of my invention together with the apparatus which I now consider to represent the best embodiments thereof, I desire to have it understood that the apparatus shown is merely illustrative and that the invention may be carried out by other means.

What I claim as new and desire to secure by Letters Patent of the United States is:

1. In a valve for controlling the flow of high-pressure high-temperature fluid and having a stationary casing member forming a chamber with inlet and outlet openings and a valve seat, a bushing secured to the casing member and projecting into the chamber, and a movable valve member having a valve disk for cooperation with the seat and a stem rigidly supporting the disk and having sliding clearance with the bushing, the provision of means for protecting a portion of the stem within the chamber from fluid flowing therethrough to reduce the formation of deposits on such portion and to reduce access of solid matter into the clearance between the stem and the bushing, said means comprising a shield within the chamber secured to one of the members and having a portion forming a knife edge in substantial engagement with the other member.

2. In a valve for controlling the flow of high-pressure high-temperature elastic fluid, a casing member forming a chamber with inlet and outlet openings and a valve seat, means including a bushing secured to the casing and having an end located in the chamber, a movable valve member comprising a disk in cooperative relation with the seat, a stem rigidly secured to the disk and having sliding clearance with the bushing, and means protecting the stem portion near said end of the bushing in the chamber from fluid flowing therethrough to reduce access of solids into the clearance between the bushing and the stem and to reduce the formation of deposits on the stem, said means comprising a shield disposed within the chamber and having a cylindrical part of a length of the order of the valve lift concentrically spaced from said stem portion, one end of the shield being secured to the casing member and the other end of the shield being turned inward and having a knife edge in substantial engagement with the movable valve member.

GLENN B. WARREN.